(12) United States Patent
Abe et al.

(10) Patent No.: US 8,935,907 B2
(45) Date of Patent: Jan. 20, 2015

(54) ELECTRIC LAWN MOWERS

(75) Inventors: Hideki Abe, Anjo (JP); Toshikazu Migita, Anjo (JP)

(73) Assignee: Makita Corporation, Aichi (JP)

( * ) Notice: Subject to any disclaimer, the term of this patent is extended or adjusted under 35 U.S.C. 154(b) by 84 days.

(21) Appl. No.: 13/495,358

(22) Filed: Jun. 13, 2012

(65) Prior Publication Data

US 2012/0317948 A1 Dec. 20, 2012

(30) Foreign Application Priority Data

Jun. 14, 2011 (JP) ................................. 2011-132150

(51) Int. Cl.
*A01D 69/00* (2006.01)
*A01D 34/78* (2006.01)
*A01D 34/82* (2006.01)

(52) U.S. Cl.
CPC .............. *A01D 34/78* (2013.01); *A01D 34/828* (2013.01)
USPC .......................................... 56/11.9; 56/320.1

(58) Field of Classification Search
USPC ................................. 56/11.9, 320.1
See application file for complete search history.

(56) References Cited

U.S. PATENT DOCUMENTS

| | | | | |
|---|---|---|---|---|
| 3,676,989 A * | 7/1972 | Slayton | ........................... | 56/10.5 |
| 5,085,043 A * | 2/1992 | Hess et al. | ...................... | 56/10.5 |
| 5,301,494 A * | 4/1994 | Peot et al. | ....................... | 56/10.5 |
| 5,490,370 A * | 2/1996 | McNair et al. | .................. | 56/11.9 |
| 5,606,851 A | 3/1997 | Bruener et al. | | |
| 5,736,837 A | 4/1998 | Noda | | |
| 5,806,374 A | 9/1998 | Mizutani et al. | | |
| 5,910,091 A | 6/1999 | Iida et al. | | |
| 6,195,970 B1 * | 3/2001 | Held et al. | ...................... | 56/16.7 |
| 6,658,829 B2 | 12/2003 | Kobayashi et al. | | |
| 2003/0037522 A1 | 2/2003 | Kobayashi et al. | | |
| 2008/0086997 A1 * | 4/2008 | Lucas et al. | .................... | 56/10.6 |
| 2010/0275564 A1 | 11/2010 | Baetica et al. | | |

FOREIGN PATENT DOCUMENTS

| | | |
|---|---|---|
| EP | 0829196 | 3/1998 |
| EP | 1285568 | 2/2003 |
| GB | 2328359 | 2/1999 |
| JP | 3160759 | 2/2001 |
| JP | 3329654 | 7/2002 |
| JP | 3553277 | 5/2004 |
| JP | 2004-357573 | 12/2004 |
| JP | 3776772 | 3/2006 |

OTHER PUBLICATIONS

Search report from E.P.O., mail date is Oct. 26, 2012.
U.S. Appl. No. 13/495,305 to Hideki Abe et al., filed Jun. 13, 2012.

(Continued)

*Primary Examiner* — Alicia Torres
(74) *Attorney, Agent, or Firm* — Greenblum & Bernstein, P.L.C.

(57) ABSTRACT

An electric lawn mower may include a mower body including an electric motor, a cutting blade rotatably driven by the electric motor for mowing a lawn, a battery mount configured to hold a battery, and a lock including a key and a key receiver for locking and unlocking the electric motor. The key receiver may be spaced from the battery mount and when the key is inserted into the key receiver, the electric motor may be unlocked for operation.

13 Claims, 16 Drawing Sheets

(56) References Cited

OTHER PUBLICATIONS

U.S. Appl. No. 13/495,388 to Hideki Abe et al., filed Jun. 13, 2012.
Neuton Battery-Powered Mower Safety and Operating InstructionsMay 2010.
Bosch Rotak 43LI Cordless Rotary Lawn Mower Images (5).
Neuton Battery-Powered Mower Model: CE6.3, Images (3).
Japense Office action dated Oct. 21, 2014, along with an English-language translation thereof.

\* cited by examiner

ELECTRIC LAWN MOWERS

This application claims priority to Japanese patent application serial number 2011-132150, the contents of which are incorporated herein by reference.

BACKGROUND OF THE INVENTION

1. Field of the Invention

Embodiments of the present invention relate to electric lawn mowers that may be used outdoors for mowing grass or the like.

2. Description of the Related Art

Known lawn mowers generally include a mower body and a handle. The mower body is typically provided with wheels. The handle extends obliquely upward in a rearward direction from the mower body. The user may grasp the handle and push the mower body to move the same for performing a lawn mowing operation. The mower body may have a cutting blade that is rotatably driven by an electric motor as a drive source. In general, the motor is disposed within the mower body with its axis oriented in the vertical direction. The cutting blade rotates within a horizontal plane about the motor axis at a position along the lower surface of the mower body. Therefore, changing the vertical position of the wheels relative to the mower body can change the cutting height or the mowing height. EP0829196A2 (also published as Japanese Patent No. 3160759 and U.S. Pat. No. 5,910,091), U.S. Pat. No. 5,806,374 (also published as Japanese Patent No. 3329654), U.S. Pat. No. 5,736,837 (also published as Japanese Patent No. 3553277) and EP1285568A1 (also published as Japanese Patent No. 3776772 and U.S. Pat. No. 6,658,829) teach various techniques regarding electric lawn mowers.

In addition to electric lawn mowers driven by an AC power source, there have been proposed DC powered electric lawn mowers that can use batteries serving as DC power sources. When a DC powered electric lawn mower is used, the user does not need to lug a long power cord, and therefore, the performance (usability) in handling the lawn mower outdoors may be improved and the mowing operation can be efficiently performed. The battery may be removed from the tool body for recharging by a battery charger, so that the battery can be repeatedly used.

In recent years, battery packs having a battery case and a plurality of lithium-ion battery cells disposed within the battery case have been broadly used as batteries for power tools, etc. Therefore, there have been proposed electric lawn mowers having lithium-ion battery packs as power sources.

A device for preventing the unintentional use of an electric lawn mover has been proposed. For example, a key has been used in the operation of a start switch for starting the electric motor. The engine can only be started when the key has been inserted into a given key insertion portion and moved to an operable position. With this device, any person who does not have a key and is not authorized to use the lawn mower, cannot start the electric motor. However, it may be possible that the user forgets to remove the key from the key insertion portion.

There is the need in the art for an improvement in the usability of an unauthorized use preventing device for an electric mower.

SUMMARY OF THE INVENTION

In one aspect according to the present teachings, an electric lawn mower includes a mower body having a battery mount device configured to be able to hold a mounted battery. The electric lower mower further includes an unauthorized use preventing device for preventing the unauthorized use of the electric lawn mower. The unauthorized use preventing device preferably includes a key and a key receiver. The key receiver may be disposed at the mower body at a position proximal the battery mount device. Alternatively, it can be located a position near a battery mounted to the battery mount device.

BRIEF DESCRIPTION OF THE DRAWINGS

FIG. 7 is a view showing the positional relationship between primary components of the switch device as viewed in the same direction as FIG. 6 and showing the state where both of first and second switches are not operated to be turned on;

FIG. 9 is a front view of the switch device similar to FIG. 8 but showing the state where only the first switch has been operated to be turned on;

FIG. 10 is a left side view of the switch device and showing the state where only the second switch has been operated to be turned on;

DETAILED DESCRIPTION OF THE INVENTION

Figure 1:
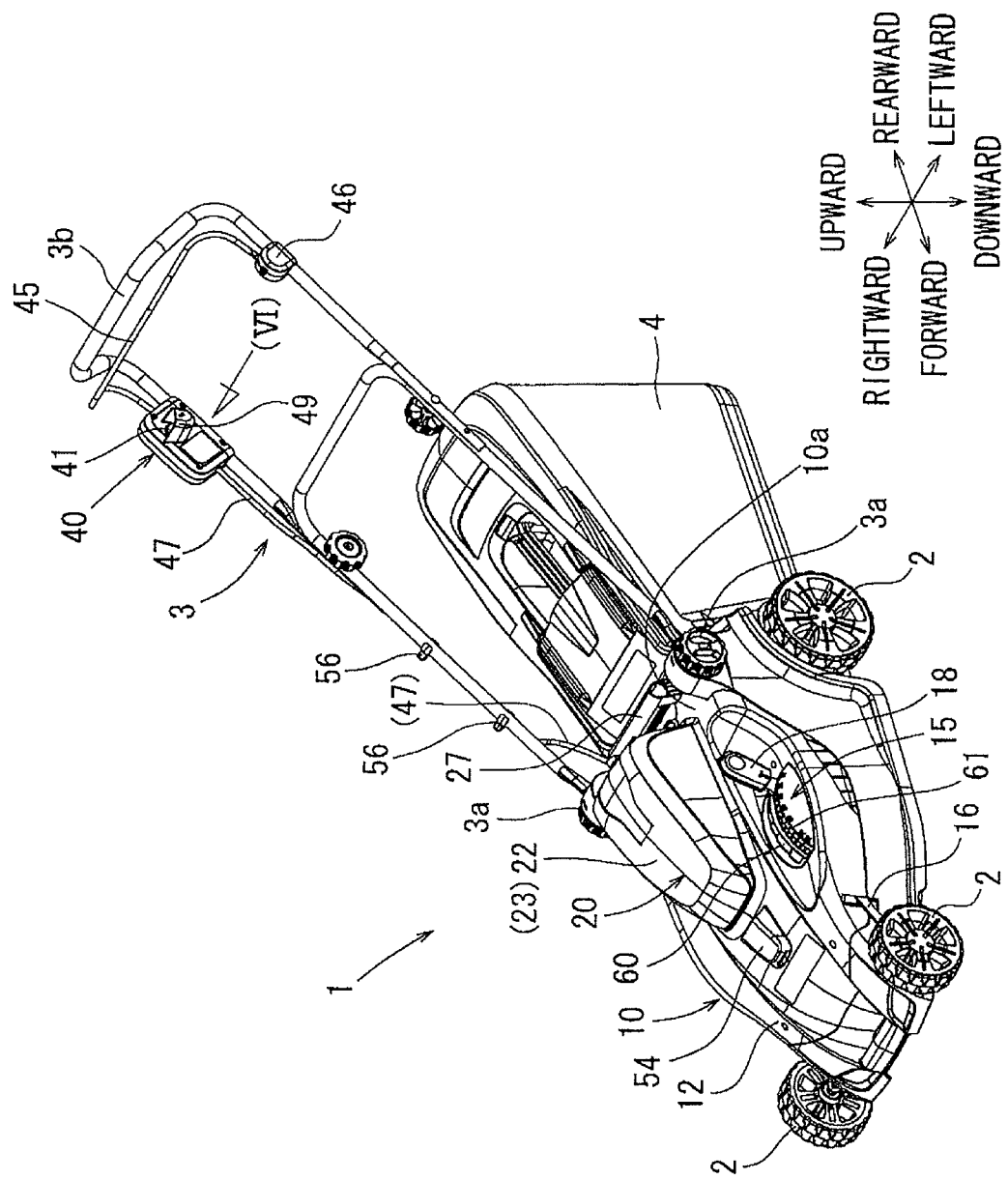
FIG. 1 is a perspective view of an electric lawn mower according to a representative example.

Each of the additional features and teachings disclosed above and below may be utilized separately or in conjunction with other features and teachings to provide improved electric lawn mowers. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, an electric lawn mower includes a mower body having an electric motor, a cutting blade rotatably driven by the electric motor for mowing a lawn, and a battery mount device configured to be able to hold a battery. The electric motor may be driven with a supply of electric power from the battery. A lock mechanism may include a key and a key insertion portion. The key may release a locked state permitting the electric motor to be started when the key is inserted into the key insertion portion. The key insertion portion is preferably disposed proximal to the battery mount device. With this arrangement, the user can look at the battery mount device and the key insertion portion in a single glance. Therefore, it is possible to reduce the likelihood that the user forgets to remove the key from the key insertion portion.

The key insertion portion may be disposed at a position that does not interfere in a path of movement of the battery. A battery is typically moved in such a path when mounting the battery to and removing the battery from the battery mount device. In this location, the key does not interfere with the mounting and removing of the battery.

The battery mount device may include a battery mount base and a battery cover. The battery mount base is preferably disposed on the mower body and configured to be able to hold the battery. The battery cover is preferably configured to be able to cover the battery mount base and can be opened and closed. The key insertion portion may be positioned so as to be covered by the battery cover when the battery cover is closed. With this arrangement, it is possible to prevent the key, the key insertion portion, the battery and the battery mount base from getting wet with outside water. It is also possible to prevent these components from being damaged. The key may include a knob portion configured as a flat plate. A locked state of the lawn mower or the engine may be released when the key is positioned such that a surface of the key extends substantially vertically along a forward and rearward direction of the mower body. In this arrangement, the knob portion preferably does not largely extend in the left and right directions. In this configuration, it is possible to reduce the width of the battery cover.

The electric lawn mower may further include a mowing height adjusting lever for changing the vertical position of the cutting blade. Adjusting the vertical position of the cutting blade thereby changes the mowing height. The key insertion portion may be positioned on the side opposite the mowing height adjusting lever with respect to the battery mount device. With this arrangement, the mowing height adjusting lever and the lock mechanism may be arranged in a well-balanced manner with respect to the left and right directions. This may also contribute to reduce the width of the mower body.

Referring to FIG. 1, an entire view of an electric lawn mower 1 is shown. The electric lawn mower 1 generally includes a mower body 10 and a handle 3. The mower body 10 is preferably provided with two front and rear pairs of left and right wheels 2. The mower body 10 further preferably includes a storage box 4 disposed on the rear side for storing mowed lawn grass, etc. The handle 3 has a shape like a frame and extends diagonally upward in the rearward direction from the rear portion of the mower body 10, so that the handle 3 extends over the storage box 4. Therefore, in order to perform a lawn mowing operation, the user may be positioned on the rear side of the lawn mower 1, grasp the handle 3 and push the lawn mower 1 forward. The handle 3 is pivotally joined to the rear portion of the mower body 10. Left and right fixing screws 3a can fix the pivoted position of the handle 3. Therefore, the handle 3 can pivot forward so as to be folded over the mower body 10 by loosening the left and right fixing screws 3a. In the following description, left and right directions with respect to parts and constructions of the lawn mower 1 mean the left and right directions as viewed from the perspective of the user who operates the lawn mower 1.

Figure 2:
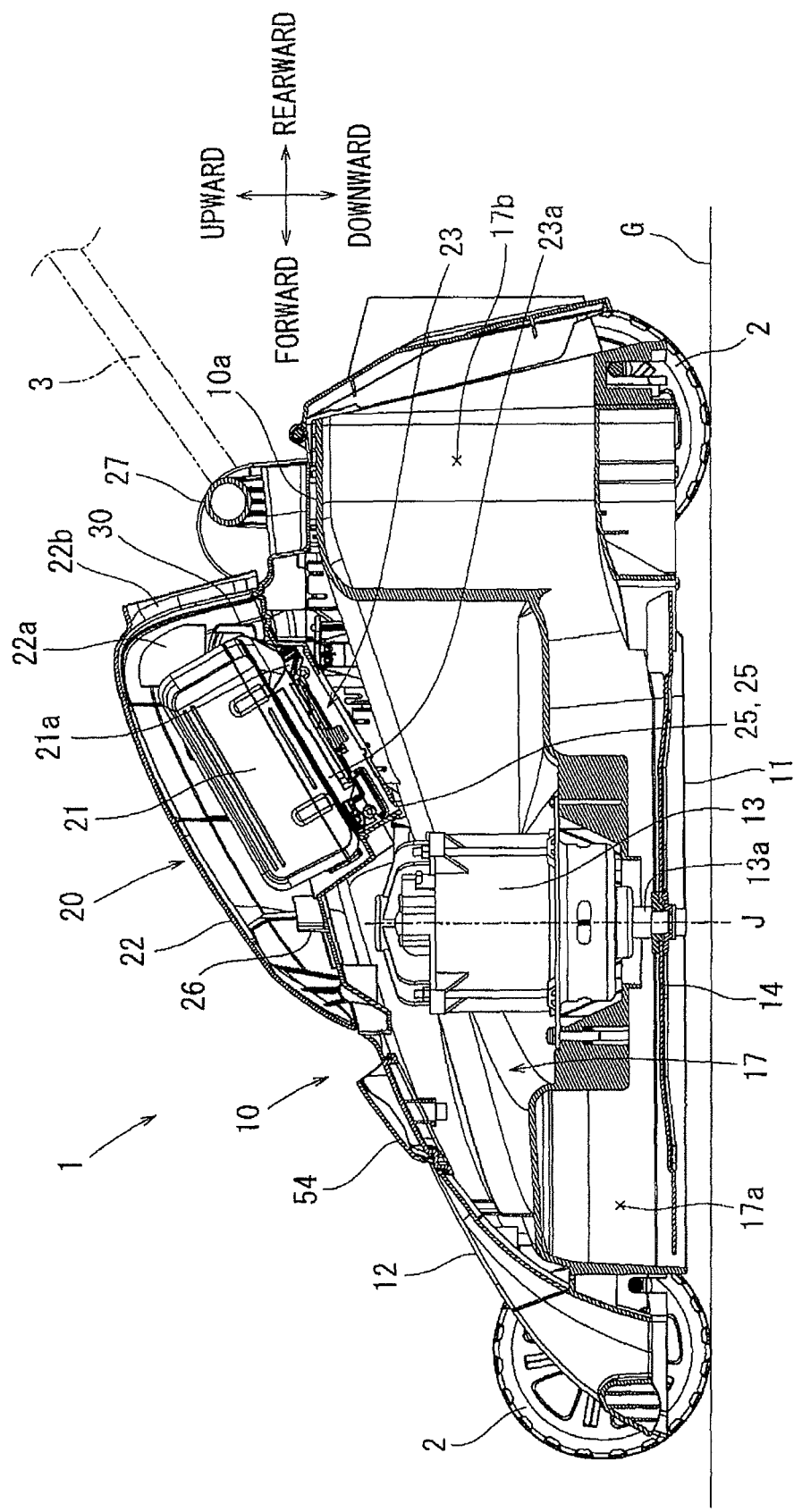
FIG. 2 is a vertical sectional view of a mower body of the electric lawn mower showing a state where a battery is mounted and a battery cover is closed.
Figure 3:
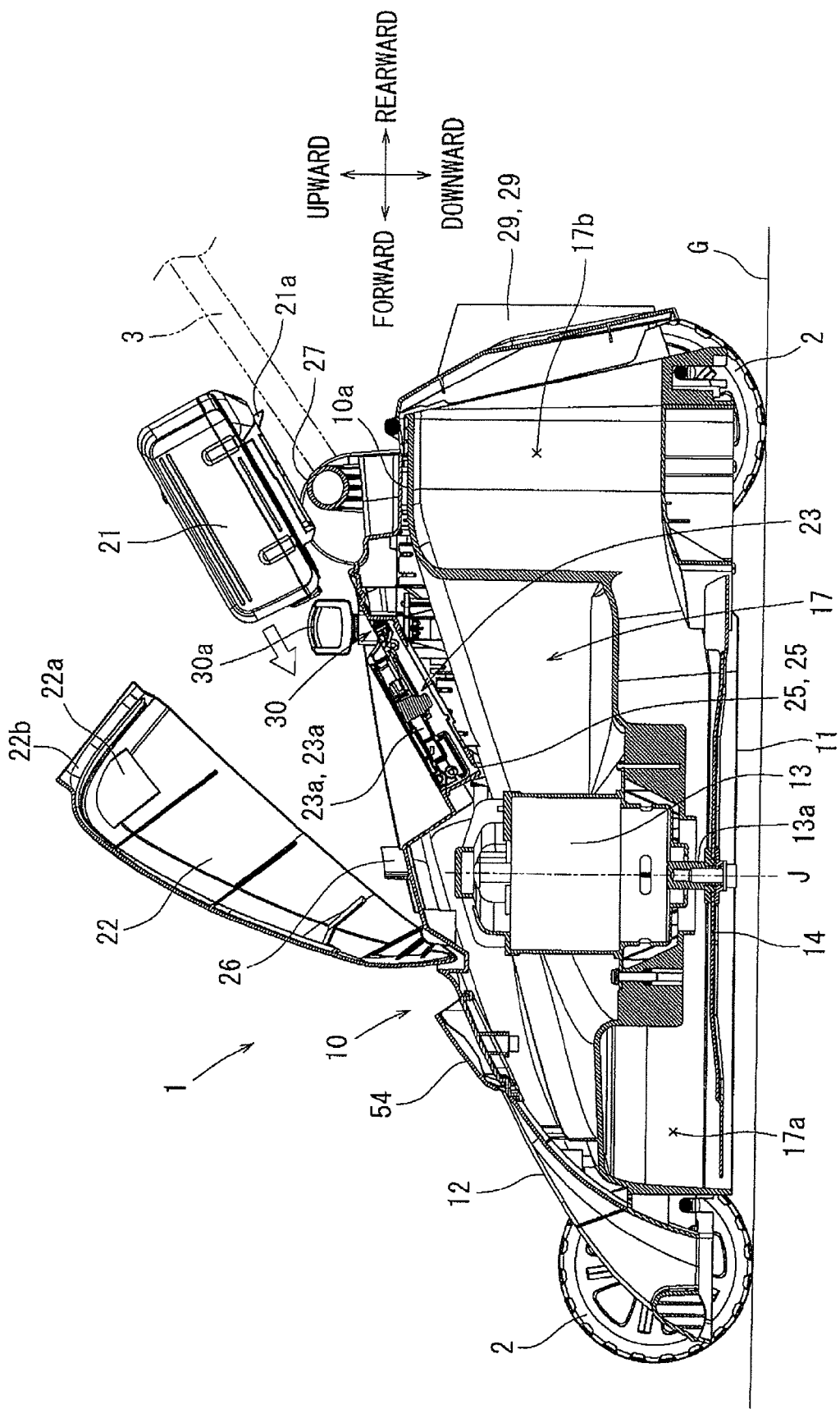
FIG. 3 is a vertical sectional view of the mower body of the electric lawn mower similar to FIG. 2 but showing a state where the battery cover is opened and the battery is removed.

As shown in FIGS. 2 and 3, the mower body 10 may include a deck portion 11 and a cowling portion 12. The deck portion 11 supports the wheels 2. The cowling portion 12 is preferably mounted to the deck portion 11 for covering the upper side of the deck portion 11. An electric motor 13 may be mounted to the deck portion 11 at substantially the central position of the deck portion 11. More specifically, the electric motor 13 is preferably mounted to the deck portion 11 in a downwardly oriented position with its output shaft 13a oriented towards a ground surface G (i.e., with its motor axis J oriented substantially perpendicular to the ground surface G).

The deck portion 11 is preferably provided with a grass-collecting duct 17 for collecting grass mowed by a cutting blade 14. The lower side of the deck portion 11 is preferably concaved upward to define a substantially cylindrical grass-collecting opening 17a of the grass-collecting duct 17. The grass-collecting opening 17a is preferably opened in a wide manner towards the ground surface G. A cutting blade 14 is preferably positioned within the grass-collecting opening 17a and extends within a substantially horizontal plane. The grass-collecting duct 17 defines a passage having a spiral shape about the axis of the electric motor 13 and extending rearward from the front portion of the grass collecting-opening 17a toward the rear side such that the depth of the passage in the upward direction becomes deeper toward the rear side. The rear end of the passage communicates with a widely opened discharge port 17b positioned at the rear portion of the mower body 10. The grass-collecting box 4 is preferably connected to the discharge port 17b.

Figure 4:
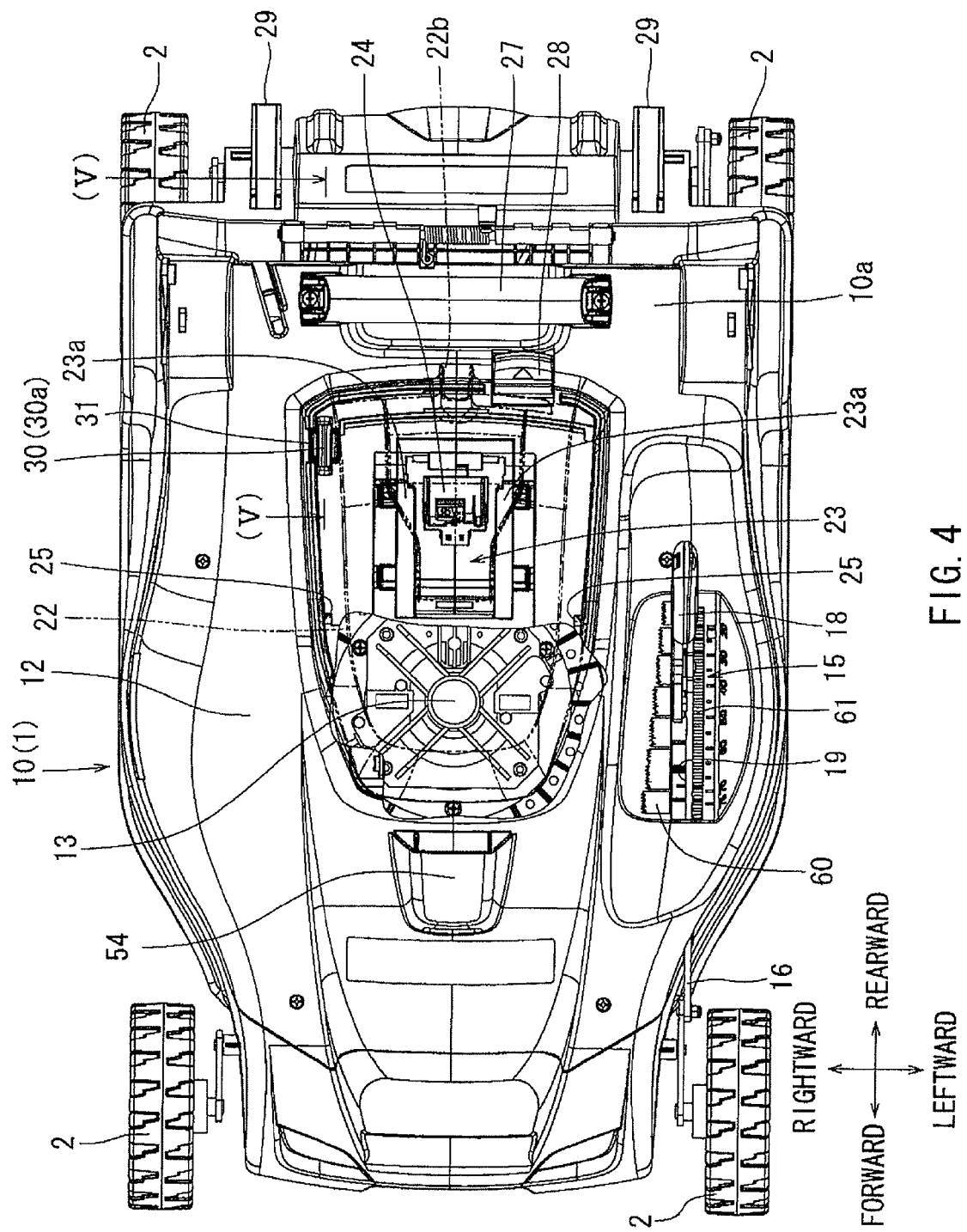
FIG. 4 is a plan view of the mower body of the electric lawn mower.

The output shaft 13a of the electric motor 13a preferably protrudes downward from the lower side of the deck portion 11. The cutting blade 14 is preferably mounted to the downwardly protruding portion of the output shaft 13a. Therefore, the cutting blade 14 rotates about the output shaft 13a within a substantially horizontal plane along the lower side of the deck portion 11. The height of the cutting blade 14 measured from the ground surface G corresponds to the mowing height of the lawn. In this example, the mowing height can be adjusted by a mowing height adjusting device 15. To this end, the wheels 2 are preferably supported on the deck portion 11 such that the wheels 2 can be moved vertically relative to the deck portion 11. As shown in FIG. 4, the mowing height adjusting device 15 may be provided with a mowing height adjusting lever 18 that can be pivoted forwards and backwards by the user. The lever 18 is coupled to the wheels 2 via a link mechanism 16, so that the vertical position of the wheels 2 can be changed according to the pivoted position of the lever 18. Hence, it is possible to adjust the vertical height of the cutting blade 14 from the ground surface G.

Electric power from a battery or batteries can be used to operate the electric lawn mower 1. To this end, a battery mount device 20 is preferably disposed at substantially centrally of the upper surface of the mower body 10, or more specifically the upper surface of the cowling portion 12. The battery mount device 20 preferably has a battery cover 22 and a battery mount base 23. The battery cover 22 may be opened and closed as it is pivoted upward and downward. As shown in FIG. 3, when the battery cover 22 is pivoted upward to be opened, the battery mount base 23 may be exposed to the outside. In this example, the battery mount base 23 is configured to be able to mount only one battery 21. When the battery cover 22 is pivoted downward and closed, the battery mount base 23 and the battery 21 mounted thereto may be covered entirely by the battery cover 22. A cord insertion hole 22b may be formed in the rear portion of the battery cover 22 for allowing passage of a power cord 53 of a battery converter 50 that will be described later.

A lithium-ion battery generally used for a battery powered electric tool, such as an electric screwdriver or an electric circular saw, may be used as the battery 21. In this example, the battery 21 is of a slide-mount type as will be hereinafter described. As shown in FIG. 4, a pair of left and right slide rails 23a are preferably mounted to the battery mount base 23. The battery 21 is configured to be able to slide on the slide rails 23a in the forward direction for mounting to the battery mount base 23 and in the rearward direction for removing from the battery mount base 23. A connector 24 may be mounted to the battery mount base 23 at a position between the slide rains 23a. When the battery 21 is slid forward on the slide rails 23a to reach the mount position, the battery 21 is electrically connected to a power source circuit (not shown) of the mower body 10 via the connector 24.

As indicated by an outline arrow in FIG. 3, in this example, a mounting direction for mounting the battery 21 to the battery mount base 23 is set to be declined in the forward direction. Thus, the surface of the battery mount base 23 is also declined in the forward direction.

As shown in FIG. 2, when the battery 21 is at the mount position on the battery mount base 23, the battery 21 is positioned generally above the electric motor 13 and rearward of the motor axis J (obliquely upward in the rearward direction). In addition, the battery 21 in the mount position is not directly opposite the motor axis J of the electric motor 13 in the vertical direction. In other words, the battery 21 at the mount position is preferably displaced a certain amount from the electric motor 13 as viewed in a plan view.

As described above, because the battery 21 is mounted to the mount base 23 at a position displaced rearward of the electric motor 21, the vertical height of the mower body 10 can be minimized. In addition, because the mounting direction of the battery 21 is inclined relative to the motor axis. From a user's perspective, the battery 21 at the mount position is declined with its rear end positioned at a height above its front end. Therefore, the mounting and removing operations of the battery 21 can be easily performed.

Further, because the battery mount base 23 is disposed at the upper surface of the cowling portion 21, the battery mount base 23 is separated from the deck portion 11 to which the electric motor 13 is mounted. In other words, the battery mount base 23 is not provided directly on the deck portion 11. Therefore, vibrations of the electric motor 13 may not be directly transmitted to the battery 21. Hence, the electric lawn mower 1 is prepared for any potential effects by vibrations to the battery 21 and its related connections.

A lock claw 21a for locking the battery 21 at the mount position relative to the battery mount base 23 and a release button (not shown) for releasing the lock condition caused by the lock claw 21a are preferably provided on the rear portion of the battery 21. The release button may be positioned at the rear end surface of the battery 21. The positional relationship between the release button and an uppermost portion 10a of the mower body 10 (more specifically, the cowling portion 12) is determined such that the release button is preferably positioned at a level higher than the uppermost portion 10a when the battery 21 is positioned at the mount position to the battery mount base 23. With this arrangement, the operation for releasing the lock condition of the battery 21 can be easily performed. In this example, the uppermost portion 10a of the mower body 10 corresponds to an upper portion of the discharge port 17b of the grass-collecting duct 17.

As shown in FIG. 4, water drain holes 25 may be formed in the left and right side regions of the front portion, i.e., the lowest portion, of the battery mount base 23 that is declined in the forward direction. The left and right water drain holes 25 are preferably displaced from the electric motor 13 as viewed in the plan view of FIG. 4 so as not to be opposed to the electric motor 13 in the vertical direction. Therefore, if water accidentally reaches the battery mount base 23, such water may be collected at the lowermost position of the battery mount base 23 and then may be discharged toward the side of the deck portion 11 via the water drain holes 25. Because the water drain holes 25 are displaced from the electric motor 13, water discharged downwardly from the water drain holes 25 may be prevented from being poured to the electric motor 13. Therefore, it is possible to ensure that the electric motor 13 is protected from outside water.

Further, as shown in FIGS. 2 and 3, a water-preventing rib 26 is preferably formed in the mower body 10 at a position on the front side of the battery mount base 23 and extending upwards therefrom. The water-preventing rib 26 preferably has a substantially semicircular-arc shape that expands forward as viewed in the plan view. When the mower body 10 is at an upright position, the water-preventing rib 26 may extend upward above the battery mount base 23. Should rain water or the like accidentally enter the inside of the battery cover 22 in the closed position (via a potential clearance that may be formed between the battery cover 22 and the mower body 10), the water-preventing rib 26 may prevent such water from directly leaking to the battery mount base 23.

A key insertion portion 31 for inserting a lock-off key 30 may be formed on the mower body 10 at a position on the right side of the battery mount base 23. In other words, the key insertion portion 31 may be positioned on the side opposite the mowing height adjusting lever 18 with respect to the center of the mower body 10. More specifically, the position of the key insertion portion 31 is preferably chosen to be on the right side of the battery 21, so that the key insertion portion 31 does not intervene in the movement path of the battery 21. The battery 23 typically moves along the movement path when it is mounted to and removed from the battery mount base 23 of the battery mount device 20.

The lock-off key 30 may be used for releasing a lock-off state. A lock-off state is the state where the battery 21 is electrically disconnected to the power source circuit and no electric power is supplied to the electric motor 13 of the mower body 10. Therefore, the electric motor 30 may not be started even in the event that the user operates a start switch. In order to release the lock-off state, the user may insert the lock-off key 30 into the key insertion portion 31 and turn it to the right or left, so that the battery 21 may be electrically connected to the power source circuit. In this way, the lock-off key 30 can be used for maintaining or releasing the lock-off state of the electric motor 13.

The key insertion portion 31 is positioned within a range that can be covered by the battery cover 22. Therefore, the key insertion portion 31 and the lock-off key 30 can be prevented from being getting wet.

Figure 5:
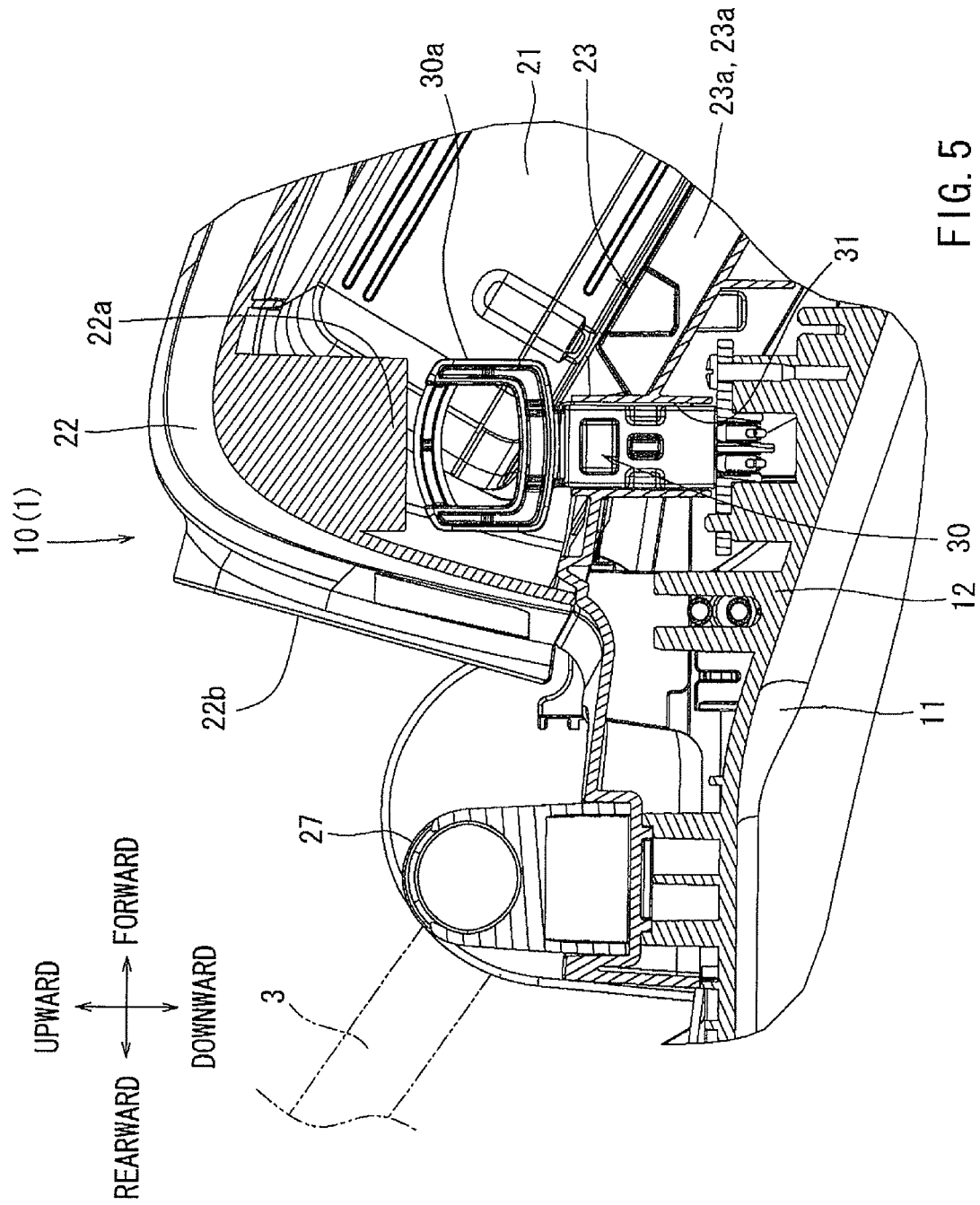
FIG. 5 is a sectional view taken along line (V)-(V) in FIG. 4 and showing a lock-off key and a region around the lock-off key.

As shown in FIG. 5, a restricting projection 22a is preferably formed integrally with the inner surface of the battery cover 22. The restricting projection 22a may be positioned directly above the lock-off key 30 when the battery cover 22 is closed. Therefore, the restricting projection 22a can prevent accidental removal of the lock-off key 30 due to vibrations or the like. As the battery cover 22 is opened, the restricting projection 22a moves upwardly away from the lock-off key 30, so that the user can remove the lock-off key 30 from the key insertion portion 31.

As shown in FIG. 4, the lock-off key 30 may be provided with a knob portion 30a having a configuration like a generally flat plate. The lock-off key 30 may be inserted into the key insertion portion 31 with the surface of the knob portion 30a extending in the forward and rearward directions. Therefore, the lock-off key 30 can be inserted into the key insertion portion 31 with a minimal distance extending in the left and right directions. Hence, the lock-off key 30 can be positioned close to the battery mount base 32. In addition, the width of the battery cover 22, with respect to the left and right directions, can be minimized. The lock-off key 30 can be positioned inside the battery cover 22 when the battery cover 22 is closed.

Further, positioning the lock-off key 30 close to the battery mount base 32 enables the user to readily view the look-off key 30 and the battery mount base 32 in one glance. Therefore, it is possible to ensure that the battery 21 and the lock-off key 30 may not be accidentally left behind without being removed.

As shown in FIG. 4, a carrying handle 27 is preferably attached to the uppermost portion 10a of the mower body 10 on the rear side of the battery mount base 23. The carrying handle 27 can be grasped by the user for carrying the electric lawn mower 1. A lock claw (not shown) for locking the battery cover 22 at a close position and a release lever 28 for releasing the lock condition of the battery cover 22 at the close position may be disposed at the rear portion of the battery mount base 23 on the front side of the carrying handle 27. Further, a pair of left and right legs 29 are preferably provided on the rear portion of the mower body 10. By using these legs 29, the mower body 10 can be self-supported in an upright position, so that the electric lawn mower 1 can be stored with the mower body 10.

Figure 6:
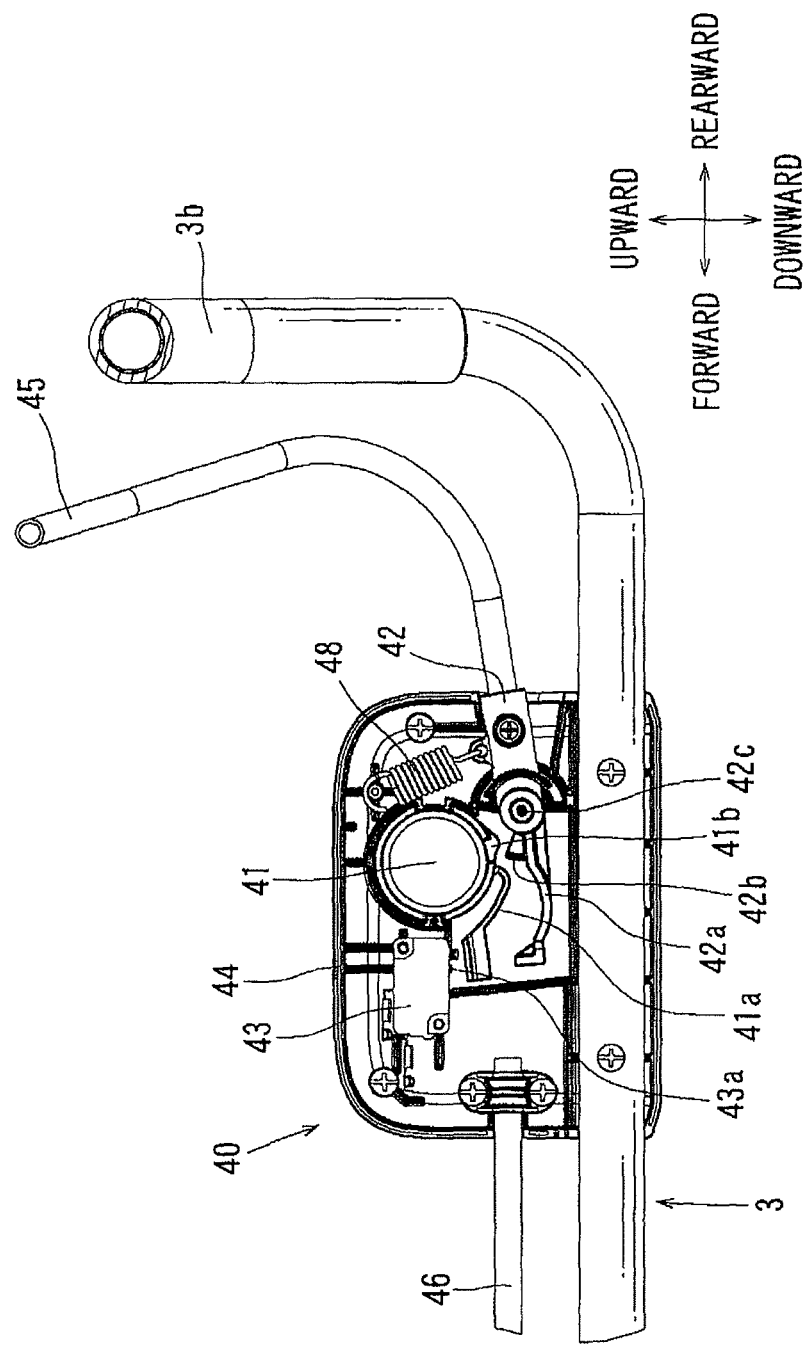
FIG. 6 is a vertical sectional view of a switch device as viewed in a direction indicated by arrow (VI) in FIG. 1.

A dual operation switch device 40 is preferably mounted to the right side of the handle 3 and is shown in detail in FIG. 6. The switch device 40 preferably includes a first switch member 41 of a push-button type, a second switch member 42 of a lever-type, and a main switch 43. The first switch member 41, the second switch member 42 and the main switch 43 are preferably disposed within a switch case 44 that is mounted to the right side of the handle 3 at a position enabling the user to easily operate the switch device 40. Within the switch case 44, the second switch member 42 is preferably positioned on the lower side of the first switch member 41, and the main switch 43 is preferably positioned in front of the first switch member 41.

The first switch member 41 is preferably configured as a cylindrical push button and is preferably supported within the switch case 44 so as to be movable in a direction perpendicular to the sheet surface of FIG. 6 (i.e., left and right direction). The first switch member 41 preferably has a head that protrudes leftward through the left side wall of the switch case 44. The lower side of the head is covered by a switch cover 49 that has a substantially semicircular cross-section and is preferably integrally formed with the left side wall of the switch case 44. The switch cover 49 can prevent the first switch member 41 from being unintentionally operated due to unintentional contact with the user's hand or other objects.

The first switch member 41 may be spring-biased toward an off position that is positioned on the front side with respect to the sheet surface of FIG. 6. The first switch member 41 may be moved to an on-operation position when the user pushes the first switch member 41 into the switch cover 49 with his or her finger against the biasing force.

The second switch member 42 is preferably vertically pivotally supported by a support rod 42c within the switch case 44. The rear end of the second switch member 42 is preferably connected to one end of a switch lever 45. The switch lever 45 preferably extends rearward through the rear wall of the switch case 44 and is bent to the left along a grip portion 3b of the handle 3. The other end of the switch lever 45 is preferably vertically pivotally joined to the left side part of the handle 3 via a pivotal support 46. With this construction, the user can operate the second switch member 42 between an on and an off position. In this example, the second switch member 42 is moved to the on-operation position as the switch lever 45 is pivoted downward, and the second switch member 42 is moved to the off-operation position as the switch lever 45 is pivoted upward. A tension spring 48 preferably biases the switch lever 45 toward a position where the second switch member 42 is positioned at the off-operation position.

The main switch 43 has an operation button 43a that is preferably spring-biased toward an off position. A known microswitch may be used as the main switch 43. In this example, the main switch 43 is fixed within the switch case 44 in such a state that the operation button 43a is oriented downward. Therefore, as the operation button 43a is pushed upward into the switch case 44, the main switch 43 is turned on to output an on signal that is transmitted to the power source circuit of the mower body 10 via a wire 47.

The switch device 40 of this example has a lock-off function that confirms the operation of the second switch member 42 for turning on the main switch 43 only after the first switch member 41 has been operated to move to the on-operation position. According to this lock-off function, the first switch member 41 cannot be operated to be moved to the on-operation position if the second switch member 42 has already been operated to be moved to the on-operation position. Therefore, the main switch 43 may be held in the off state. As a result, it is possible to prevent the electric motor 13 from being accidentally started. In the following description, an operation sequence, in which the second switch member 42 is moved to the on-operation position after the first switch member 41 has moved to the on-operation position, will be called a "proper operation sequence". An operation sequence, in which the second switch member 42 is operated to be moved to the on-operation position before the first switch member 41 has moved to the on-operation position, will be called an "improper operation sequence." In this way, the switch device 40 uses the lock-off function to allow the electric motor 13 to be started if the first and second switch members 41 and 42 are operated according to the proper operation sequence. Conversely, it may inhibit the electric motor 13 from starting if the first and second switch members 41 and 42 are operated according to the improper operation sequence.

Figure 7:
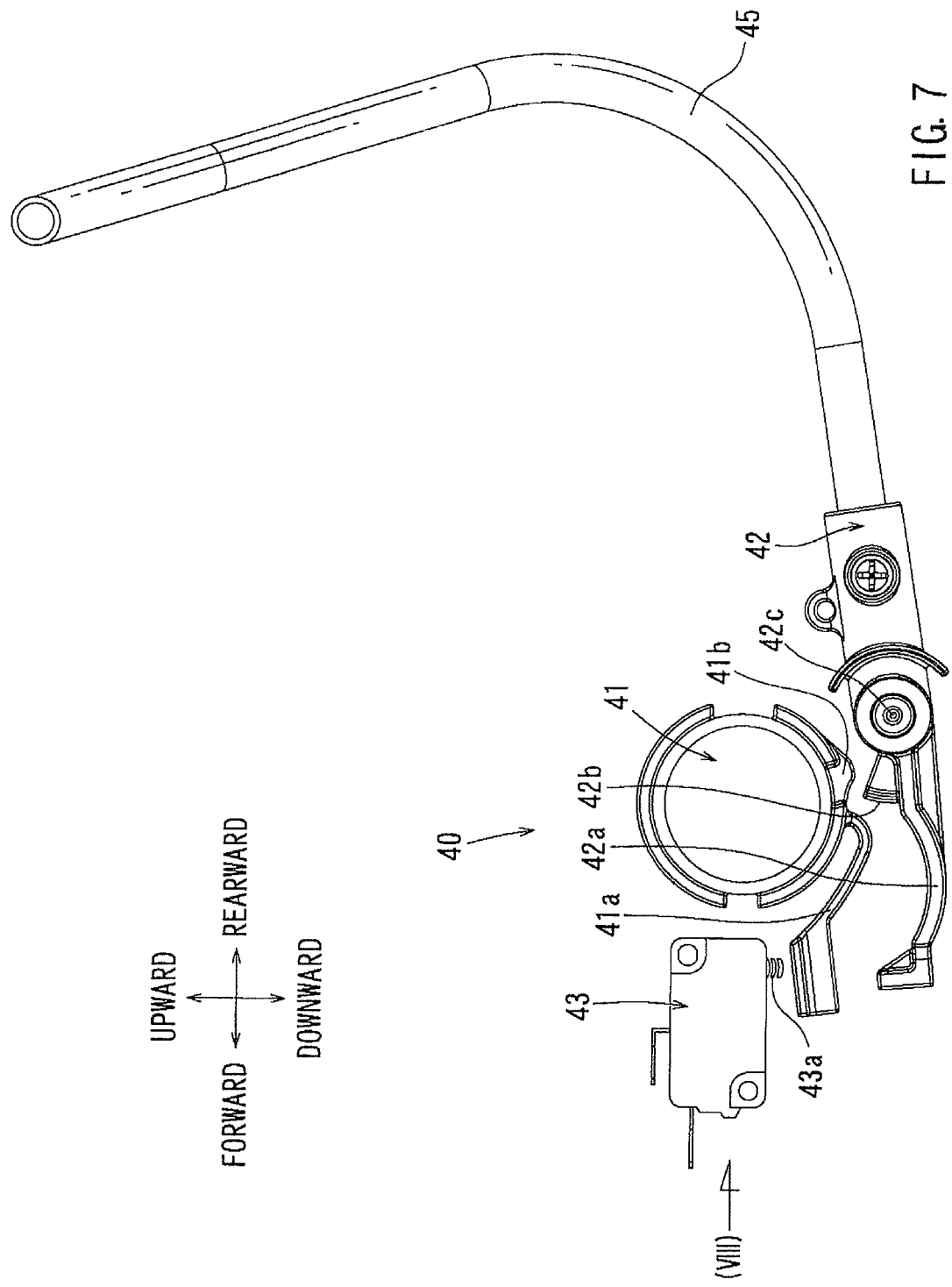

As shown in FIGS. 6 and 7, a first actuation member 41a may be formed integrally with the lower portion of the cylindrical side surface of the first switch member 41. It may extend forward toward the main switch 43 from the lower portion of the cylindrical side surface. A first interference avoidance member 41b may be formed on or mounted to the lower portion of the cylindrical side surface of the first switch member 41. It is preferably located at a position on the rear side of the base portion of the first actuation member 41a. The first interference avoidance member 41b is preferably formed to have a shape protruding downward at an angle from the lower portion of the cylindrical side surface.

A second actuation member 42a may be formed integrally with the front end of the second switch member 42 and extends forward to have a leading end positioned below the main switch 43. A second interference avoidance member 42b may be formed integrally with the upper surface of the base portion of the second actuation member 42a. The second interference avoidance member 42b may have a shape protruding at an upward angle.

Figure 8:
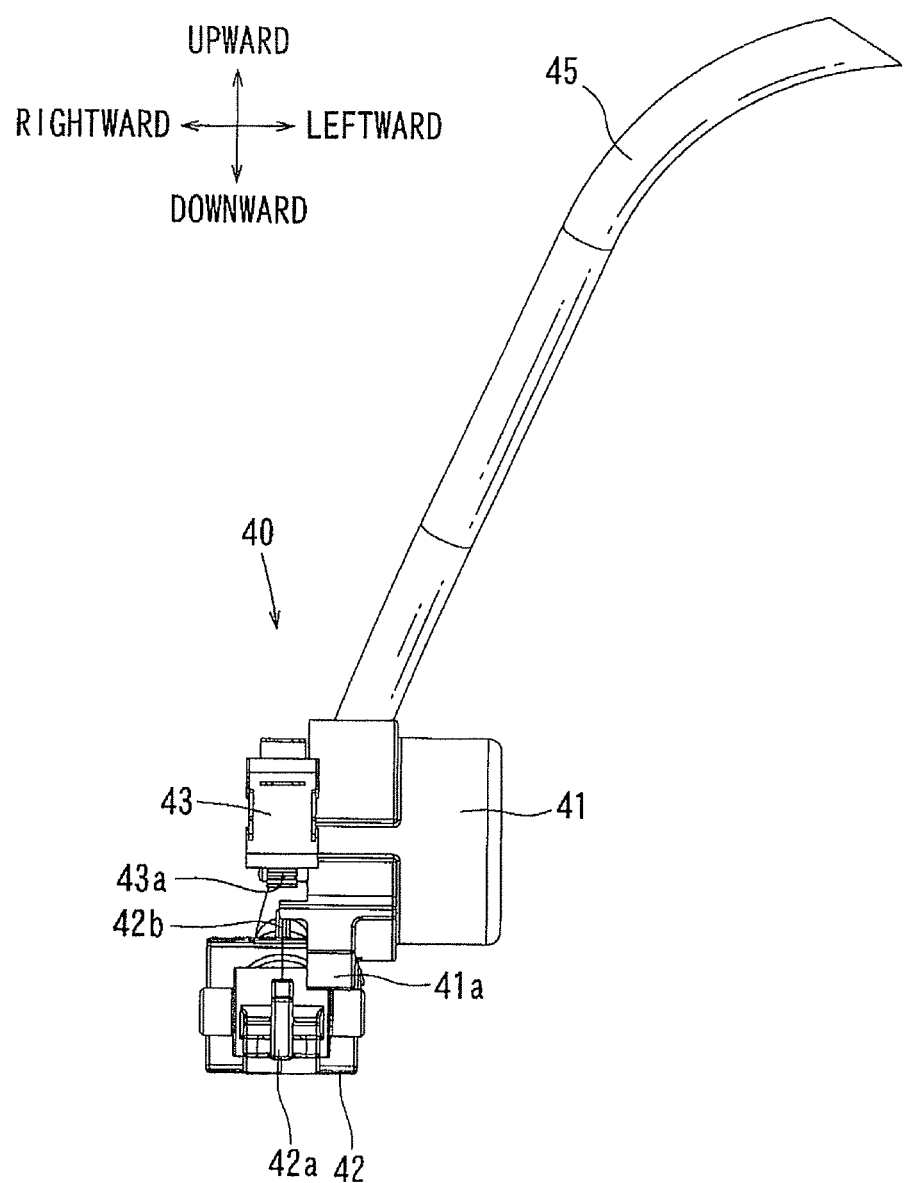
FIG. 8 is a front view of the switch device in the state shown in FIG. 7 as viewed in a direction indicated by arrow (VIII) in FIG. 7.

FIGS. 6 to 8 show non-operational states where both of the first switch member 41 and the second switch member 42 are not in the on-operation positions. In this non-operational state, the first actuation member 41a of the first switch member 41 is held at a position that is located to the left of the second actuation member 42a of the second switch member 42. It is also preferably located to the left of the area between the leading end of the second actuation member 42a and the operation button 43a of the main switch 43.

Figure 9:
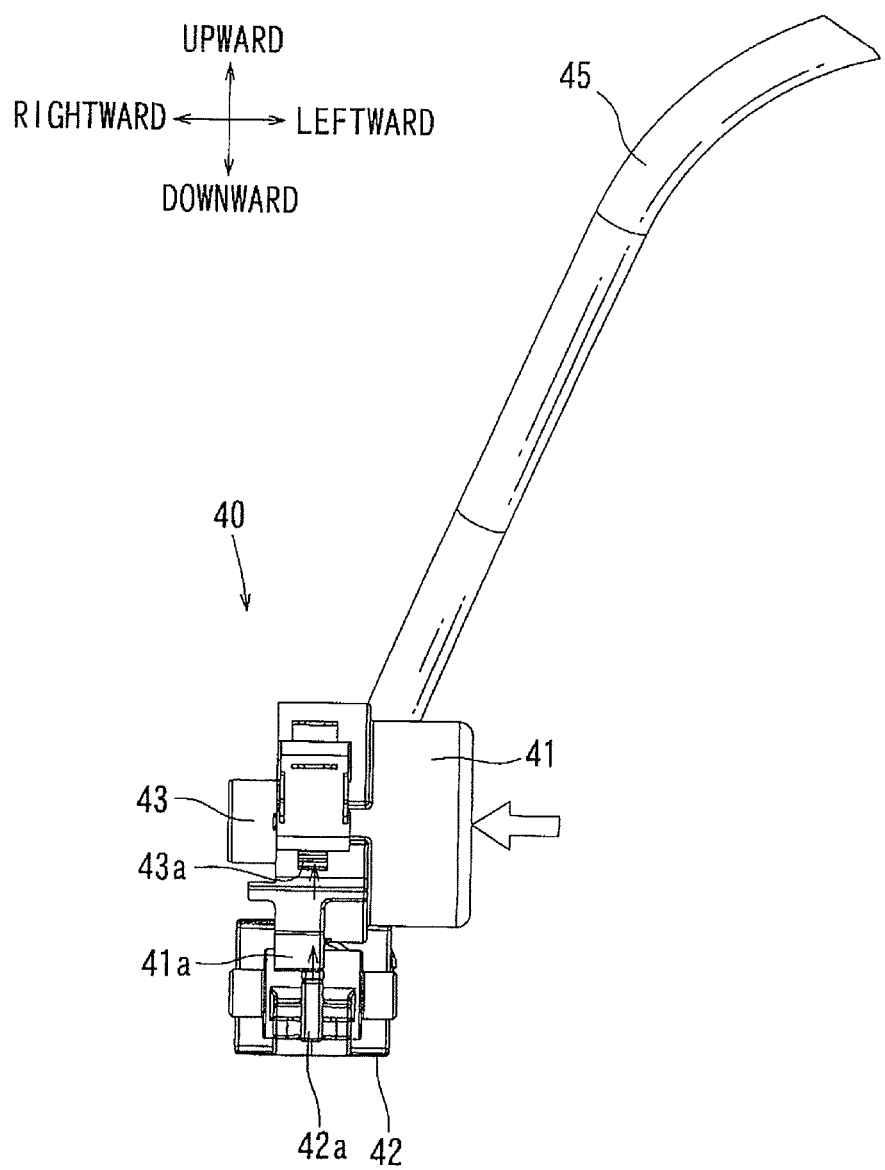

In this non-operational state, if the first switch member 41 is moved to the on-operation position according to the proper operation sequence, the first actuation member 41a may intervene in the path of movement of the second actuation member 42a. Thereafter, if the second switch member 42 is operated to be moved to the on-operation position, the first actuation member 41a may be pushed upward, as viewed in FIG. 9, so that the operation button 43a of the main switch 43 is pushed to move to the on position by the first actuation member 41a. When the main switch 43 is turned on by the operation of the second operation switch 42 to the on-operation position, the main switch 43 outputs an on signal that is supplied to the mower body 10 via the wire 47 to start the electric motor 13.

Conversely, if the second switch member 42 is operated to be moved to the on-operation position when the first switch member 41 is positioned at the off-operation position (according to the improper operation sequence), the leading end of the second actuation member 42a may pivot idly and may not reach the operation button 43a of the main switch 43. Therefore, the main switch 43 may not be turned on.

Figure 10:
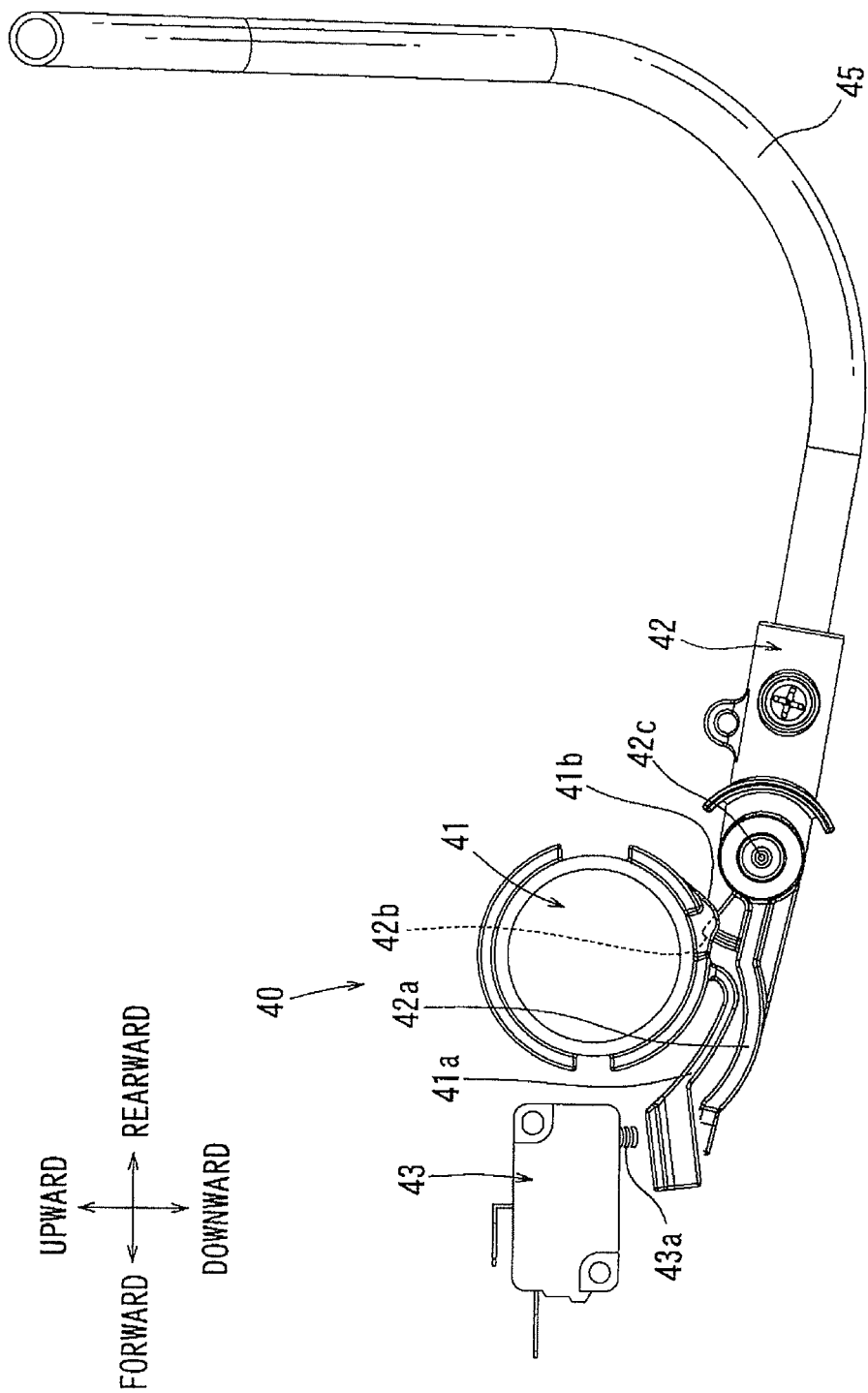

In addition, if the first switch member 41 is operated to move toward the on-operation position after the second switch member 43 has moved to the on-operation position, the first interference avoidance member 41b of the first switch member 41 may contact the second interference avoidance member 42b of the second switch member 42 as shown in FIG. 10. In this way, the first switch member 41 cannot be pushed further toward the on-operation position. Because the first interference avoidance member 41b contacts the second interference avoidance member 42b to prevent the first switch member 41 to be pushed to reach the on-operation position, it is possible to avoid potential interference of the first actuation member 41a with the second actuation member 42a of the second switch member 42.

The first interference avoidance member 41b and the second interference avoidance member 42b may both have a relatively high mechanical strength due to their configuration and may be able to resist a relatively large external force. Therefore, contact or interference between the first interference avoidance member 41b and the second interference avoidance member 42b may avoid interference between the first actuation member 41a and the second actuation member 42a. The first actuation member 41a and the second actuation member 42b are preferably configured to be elongated like an arm with relatively low mechanical strength in comparison to the first and second interference avoidance members 41b and 42b. Therefore, even in the event that the user has forcibly pushed the first switch member 41 toward the on-operation position with a large force according to the improper operation sequence, such a large force may not be applied to the first and second actuation members 41a and 42a. Hence, it is possible to avoid potential damage to the first and second actuation members 41a and 42a. This can improve the durability of the switch device 40. Although FIG. 10 shows that the leading end of the first actuation member 41a is overlapping with the leading end of the second actuation member 42a as viewed from the front side with respect to the sheet of FIG. 10, the leading end of the first actuation member 41a is spaced from the leading end of the second actuation member 42a in the direction perpendicular to the sheet surface of FIG. 10 (i.e., the left and right direction). Therefore, in the state shown in FIG. 10, the leading ends of the first and second actuation members 41a and 42a are actually not in contact with each other.

When the first switch member 41 is moved to the on-operation position in accordance with the proper operation sequence, the first interference avoidance member 41b preferably moves across the moving path of the second interference avoidance member 42b of the second switch member 42 to a position out of the moving path. Therefore, the second interference avoidance member 42b preferably does not contact the first interference avoidance member 41b if the second switch 41 is subsequently moved to the on-operation position. The positions of the first interference avoidance member 41b and the second interference avoidance member 42b can be taken at various locations where the first switch member 41 and the second switch member 42 are operated to be moved to the on-operation positions or the off-operation positions so as to determine appropriate positions of the elements.

Next, as shown in FIGS. 1 and 4, the height adjusting device 15 for adjusting the mowing height is preferably disposed at the left side portion of the mower body 10. As described previously, forward and rearward pivoting of the mowing height adjusting lever 18 can change the vertical position of the wheels 2 via the link mechanism 16. In this way, the height of the mower body 10 relative to the ground surface G can be changed so that the vertical height of the cutting blade 14 relative to the ground surface G (i.e., the mowing height) can be appropriately set.

An indicator for displaying the mowing height by way of a scale and/or a group of pictures may be provided on the lateral side of the lever 18. As shown in FIG. 4, the lever 18 extends preferably upward from within the cowling portion 12 through an insertion opening 19 formed in the cowling portion 12. A scale indicator portion 61 is preferably provided on the surface of the cowling portion 12 at a position on the left side (lower side as viewed in FIG. 4) of the insertion opening 19. The scale indicator portion 61 preferably includes scale marks and corresponding numerals indicative of the mowing height. A picture indicator portion 60 is preferably provided on the surface of the cowling portion 12 at a position on the right side (upper side as viewed in FIG. 4) of the insertion opening 19. The picture indicator portion 60 is preferably configured to indicate the cowling height mainly by pictures such as those of lawn grass. The picture indicator portion 60 may be molded onto the upper surface of the cowling portion 12.

Figure 11:
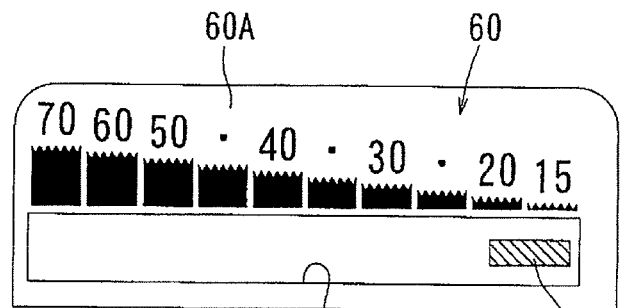
FIGS. 11(A) to 11(J) are plan views of examples of picture indicator portions for a mowing height adjusting mechanism.
Figure 11:
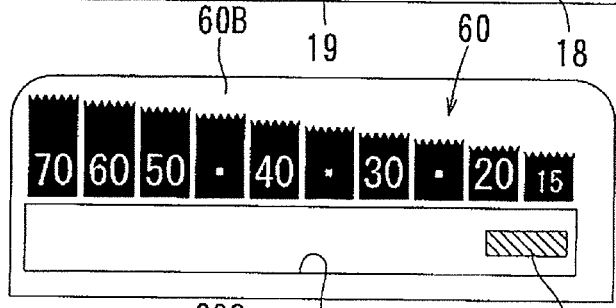
Figure 11:
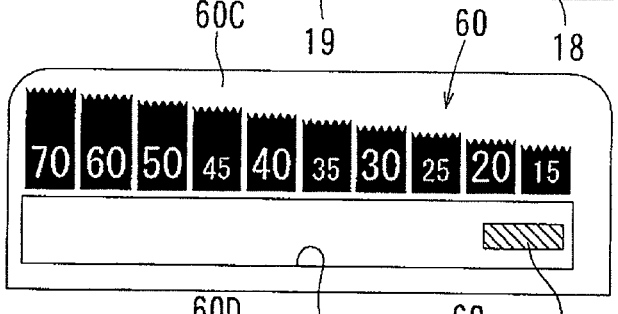
Figure 11:
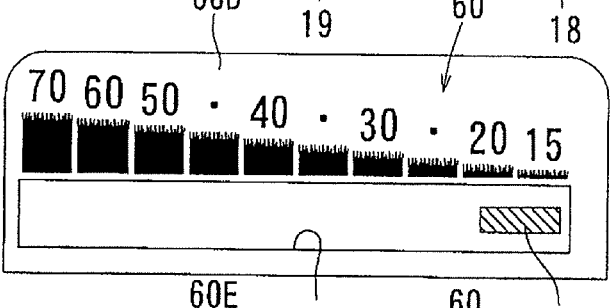
Figure 11:
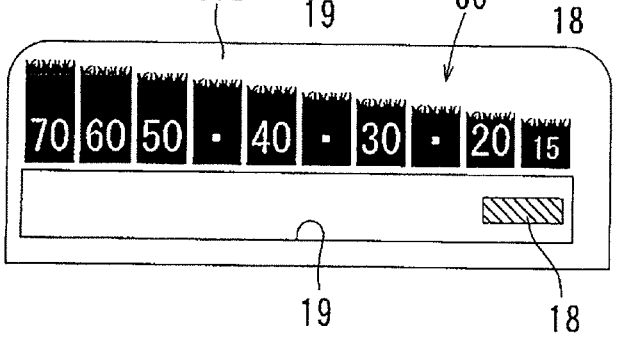
Figure 11:
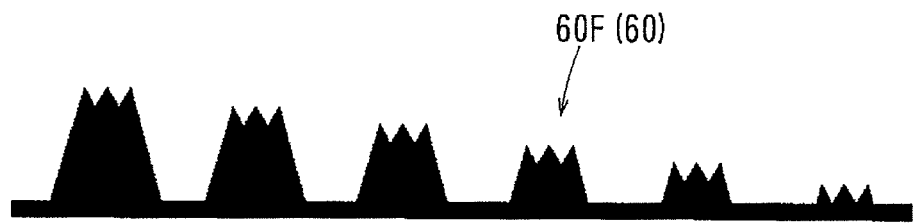
Figure 11:
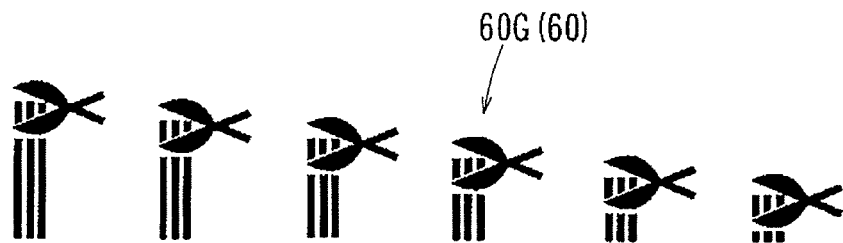
Figure 11:
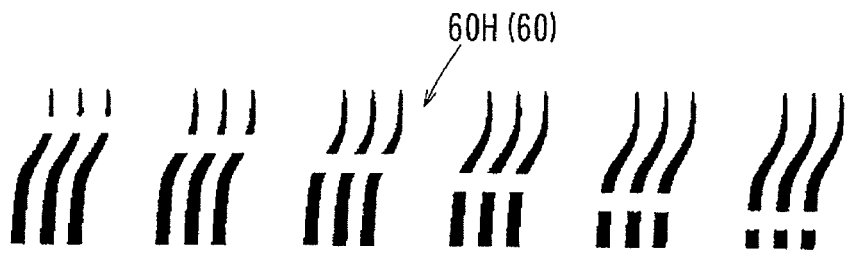
Figure 11:
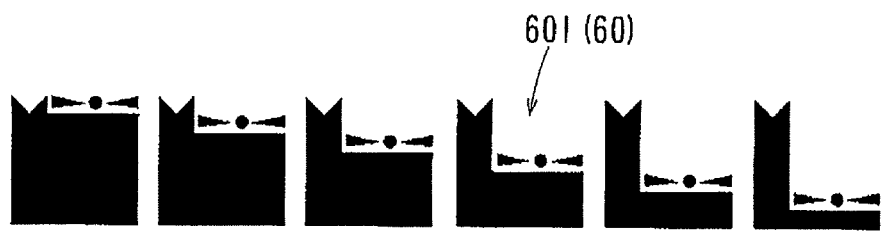
Figure 11:
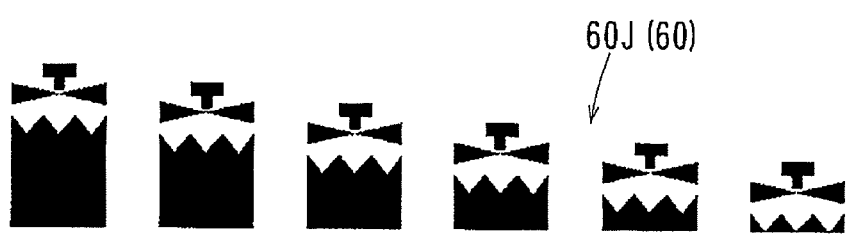

FIGS. 11(A), 11(B), 11(C), 11(D) and 11(E) show various examples of the picture indicator portion 60. In each example, the mowing height is preferably indicated by pictures on a scale of one to ten within a range of between 15 mm and 70 mm, and the pictures are arranged so that the indicated mowing height becomes gradually smaller from the leftmost picture to the rightmost picture. In other words, the mowing amount (length) of the lawn grasses becomes gradually larger from the leftmost picture to the rightmost picture. According to the example shown in FIG. 11(A), a picture indicator portion 60A preferably includes numerals on the upper side of the figures for indicating numerical values of the mowing heights indicated by the corresponding figures. However, in this example, the numerical values for the moving heights of 25 mm, 35 mm and 45 mm are replaced with dots. According to the example shown in FIG. 11(B), a picture indicator portion 60B preferably includes the numerical values of the moving heights, which are marked in the corresponding figures. Also in this example, the numerical values for the moving heights of 25 mm, 35 mm and 45 mm are replaced with dots. A picture indicator portion 60C shown in FIG. 11(C) is similar to the picture indicator portion 60B in that the numerical values for the moving heights are marked in the corresponding figures. The picture indicator portion 60C is different from the picture indicator portion 60B in that the numerical values for the moving heights of 25 mm, 35 mm and 45 mm are included but are marked with numerals that are smaller in size than the numerals used for the other moving heights.

A picture indicator portion 60D according to the example shown in FIG. 11(D) is similar to the picture indicator portion 60A in that the numerical values of the mowing heights are marked on the upper side of the figures for indicating numerical values of the mowing heights. The picture indicator portion 60D is different from the picture indicator portion 60A in that the configurations of the upper portions of the grasses indicated by the figures are more roughly drawn in comparison with those of the picture indicator portions 60A to 60C. A picture indicator portion 60E shown in FIG. 11(E) is similar to the picture indicator portion 60B in that the numerical values of the moving heights are marked in the corresponding figures. However, the configurations of the upper portions of the grasses indicated by the figures are roughly drawn as in the case of the picture indicator portion 60D. Any one of the picture indicator portions 60A to 60D may be selectively used for the picture indicator portion 60 for visually indicating the change of the mowing height along the moving direction of the lever 18. Therefore, the user can intuitively recognize the mowing condition based on the visual image, so that the operability of the electric lawn mower 1 can be further improved. For example, manufacturer of lawn mowers may select any one of the picture indicator portions 60A to 60C to suit the needs or preferences of the user.

FIGS. 11(F), 11(G), 11(H), 11(I) and 11(J) show further examples of the picture indicator portion 60. In each example shown in FIGS. 11(F) to 11(J), the mowing height is preferably indicated by pictures on a scale of one to six within a range that may similar to that of FIGS. 11(A) to 11(E). Pictures indicating the mowing heights in a picture indicator portion 60F are mountains that compare the mowing heights to heights of the mountains. Pictures indicating the mowing heights in a picture indicator portion 60G are grasses and scissors that cut the grass at different heights. Pictures indicating the mowing heights in a picture indicator portion 60H may be illustrations of lengths of grass before and/or after cutting. Pictures indicating the mowing heights in a picture indicator portion 60I are grasses with illustration of cutting blades and lengths of grasses before and after cutting. Pictures indicating the mowing heights in a picture indicator portion 60J are grasses with illustration of cutting blades and lengths of grasses after cutting.

Although the picture indicator portions 60A to 60E are designed suitable for molding onto the upper surface of the cowling portion 12 along the lever insertion opening 19, the picture indicator portions 60F to 60J may be directly printed on the upper surface of the cowling portion 12 along the lever insertion opening 19. Alternatively, the picture indicator portions 60F to 60J may be printed on labels that can be put on the upper surface of the cowling portion 12.

By visualizing the mowed heights by using figures in addition to or in place of a scale as described above, the user can readily determine the mowing condition at one glance. Therefore, the operability of the electric lawn mower 1 is also improved in this respect.

Figure 15:
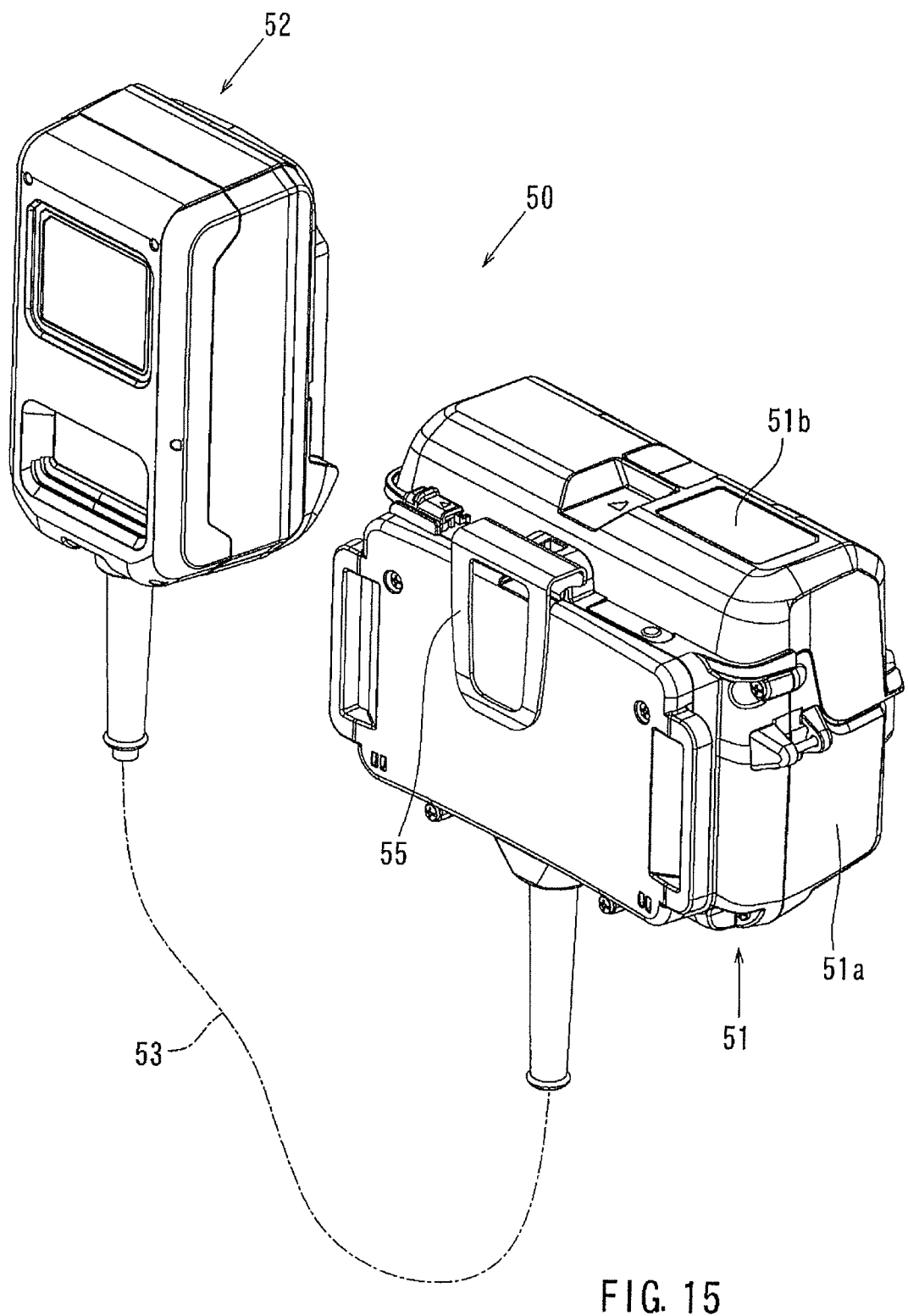
FIG. 15 is a perspective view of the battery converter.

The electric lawn mower 1 of this example is preferably configured to use a battery converter 50 shown in FIG. 15 as a power source in place of the battery 21 mounted to the upper portion of the mower body 10. The battery converter 50 preferably includes a converter body 51 and an adapter 52. Two batteries (not shown) may be stored within the converter body 51. The adapter 52 may be designed to be capable of being mounted to the battery mount device 20. The converter body 51 and the adapter 52 may be electrically connected to each other via a power cord 53. The converter body 51 preferably has a case 51a and a lid 51b for opening and closing the case 51a. The two batteries are preferably stored within the case 51a and can be removed from the case 51a by opening the lid 51b. A hook 55 is preferably provided on the backside surface of the case 51a.

In this example, the battery converter 50 may be a battery converter usable for the other type of power tool than the lawn mower. For example, the other type of power tool may include a hedge trimmer and a high-pressure water sprayer, which may be mainly used outdoors or for gardening. The adapter 52 may be mounted to the battery mount device 20 in place of the battery 20 that is a single battery. The hook 55 of the converter body 51 may be hooked to a waist belt (not shown) that may be worn by the user. Therefore, the user can carry the converter body 51 having two batteries stored therein. Hence, the user can operate a power tool that is reduced in weight, so that the operation efficiency can be improved. Further, batteries having a low rating voltage can be used for a power tool having a high rating voltage by connecting the batteries in series. Therefore, batteries can be effectively used even in the case that they have rating voltages different from that of a power tool to be used. For example, by storing two batteries each having a rating voltage of 18 V within the converter body 51, these batteries can be used for a power tool having a rating voltage of 36 V.

Figure 12:
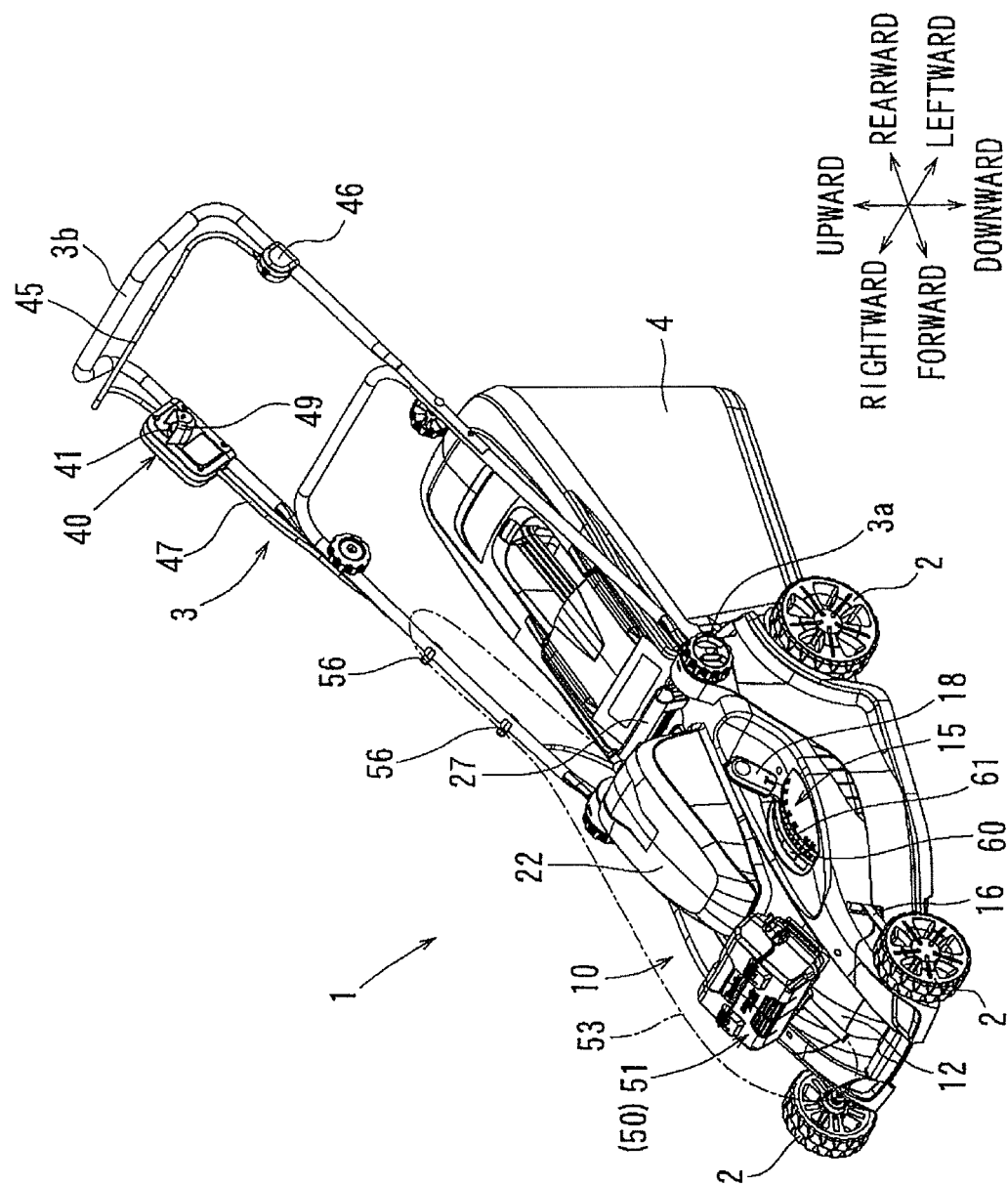
FIG. 12 is a perspective view of the electric lawn mower having a battery converter mounted thereto.
Figure 13:
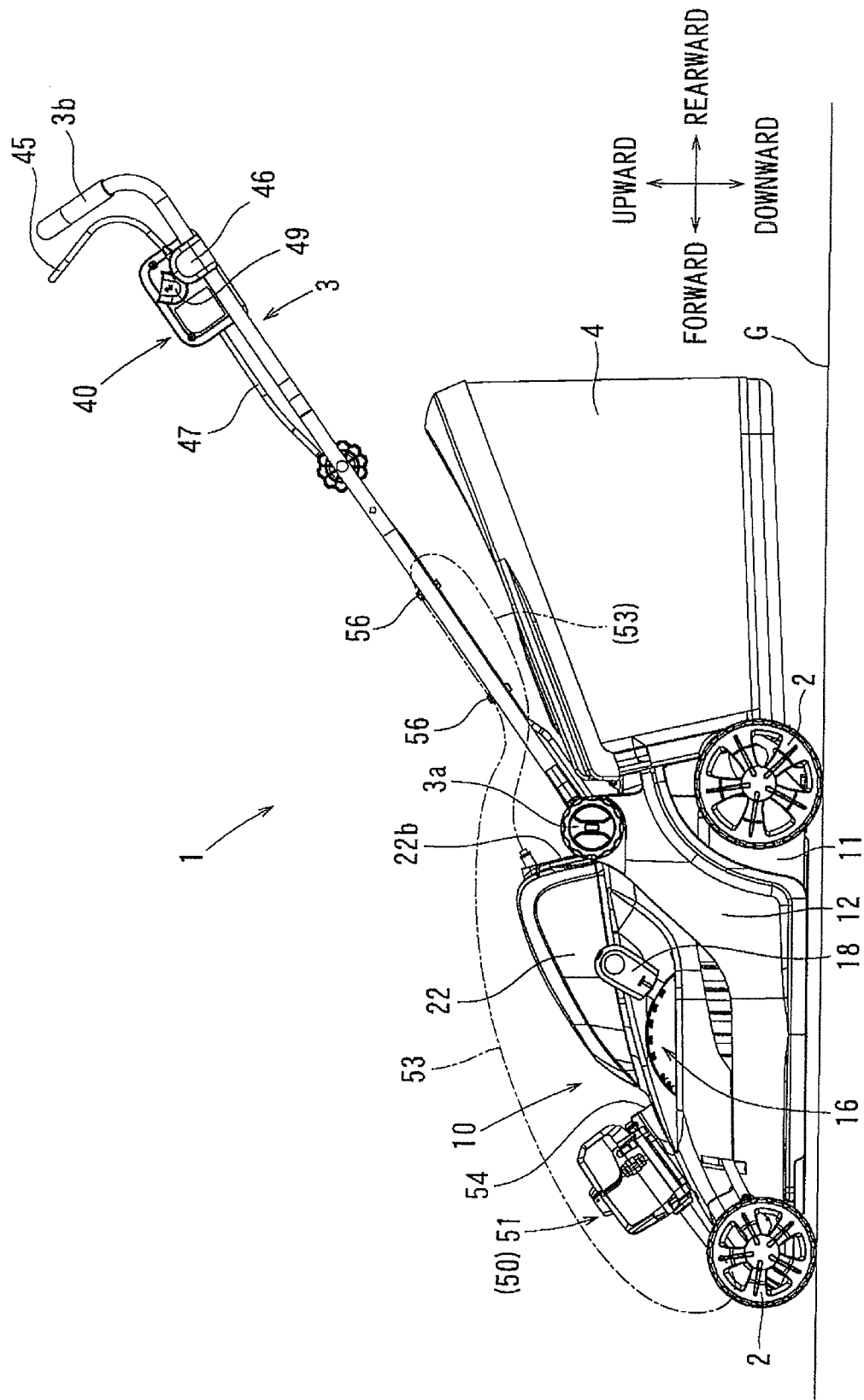
FIG. 13 is a left side view of the electric lawn mower shown in FIG. 12.
Figure 14:
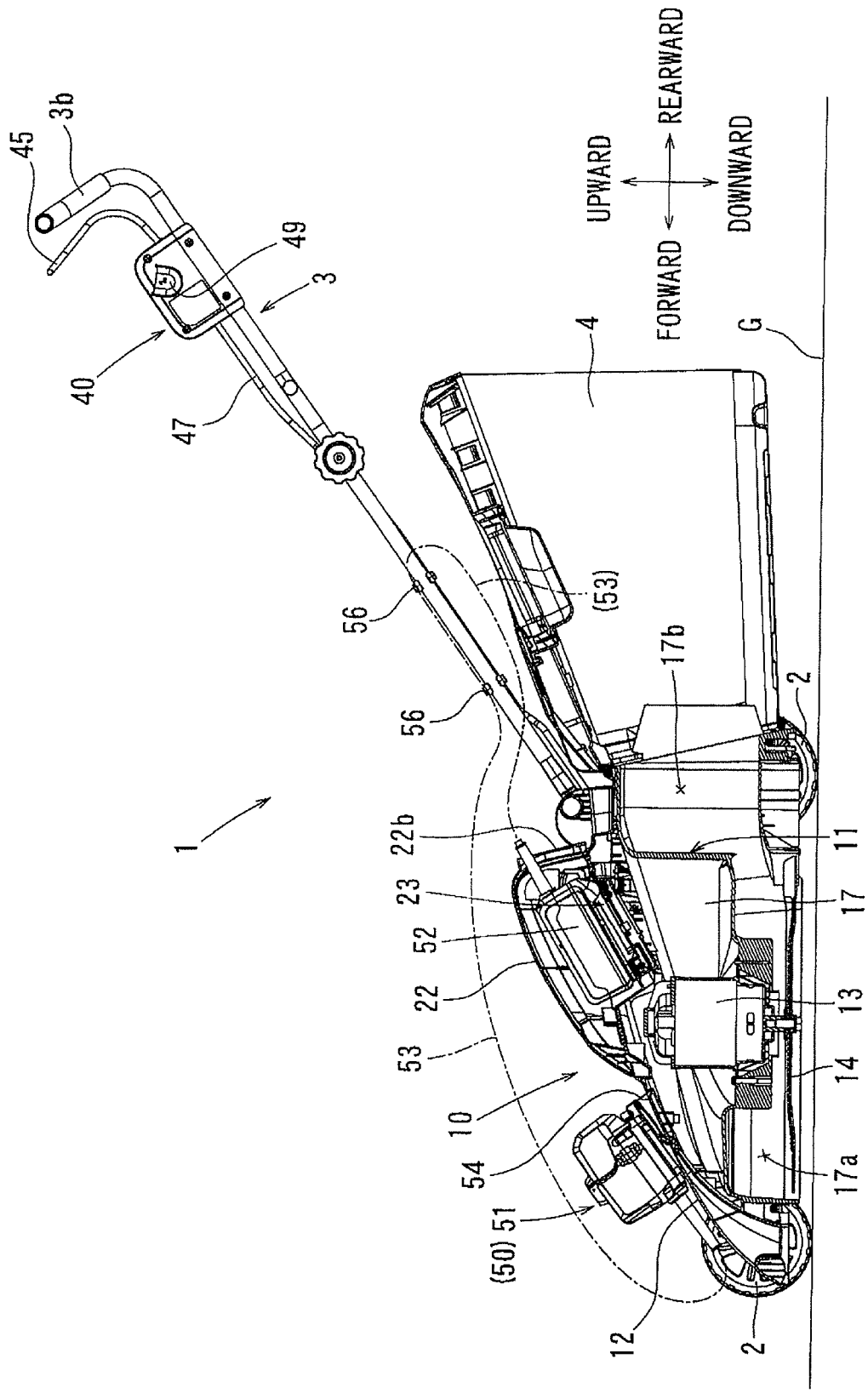
FIG. 14 is a vertical sectional view of the electric lawn mower shown in FIG. 12.

FIGS. 12 to 14 show states where the battery converter 50 may be mounted to the electric lawn mower 1. On the front side of the battery cover 12, a pocket-like engaging member 54 for engaging the hook 55 of the converter body 51 may be disposed on the upper surface of the front portion of the mower body 10 at a position substantially central with respect to the widthwise direction (left and right direction). In this example, the engaging member 54 is preferably formed integrally with the upper surface of the front portion of the converter body 51. Therefore, with the hook 55 of the converter body 51 engaged with the engaging member 54, the converter body 51 can be held on the upper surface of the front portion of the mower body 10 of the electric lawn mower 1. The converter body 51 may have a relatively large weight because two batteries are stored therein. Therefore, by positioning the converter body 51 on the upper surface of the front portion of the mower body 10 at the central position with respect to the widthwise direction, it is possible to improve the ability of the electric lawn mower 1 to move in a straight line. Hence, it is possible to improve the operability and the workability of the electric lawn mower 1.

As described previously the adapter 52 can be mounted to the battery mount device 20 of the mower body 10. Therefore, the adapter 52 may have a slide mounting structure similar to that of the battery 21, so that the adapter 52 can be mounted to the battery mount device 20 by being slid forward on the left and right slide rails 23a of the battery mount base 23 and can be removed from the battery mount device 20 by being slid rearward. Also, the adapter 52 may have a lock claw (not shown) for locking the adapter 52 at the mount position relative to the battery mount base 23 and may have a release button (not shown) for releasing the lock condition of the lock claw.

The power cord 53 electrically connecting the converter body 51 and the adapter 52 preferably has a length that is sufficient to connect the converter body 51 held at the front portion of the mower body 10 to the adapter 52 mounted to the battery mount base 23. A cord insertion hole 22b may be formed in the rear portion of battery cover 22, so that the power cord 53 may extend between inside and outside of the battery cover 22 through the cord insertion hole 22b. Two or more cord clips 56 may be attached to the right side portion of the handle 3, so that the power cord 53 can be held to extend along the right side portion of the handle 3 by the cord clips 56. Therefore, unnecessary slack of the power cord 53 can be eliminated so as not to hinder the mowing operation.

The battery 21 may be a lithium-ion battery having a rating voltage of 36 V, and the power source circuit and the electric motor 13 may be configured to operate at 36 V. On the other hand, as described previously, two batteries each having a rating voltage of 18 V may be stored within the converter body 51 and may be usable for a power tool having a voltage of 36 V. Also, these two batteries may be lithium-ion batteries. Therefore, a battery converter 50 may be used in place of the battery 21 for operating the electric lawn mower 1. Therefore, if the battery 21 is removed from the battery mount base 23 for recharging 18 V batteries typically used in other power tools, such as electric screwdrivers, can be moved to and used for operating the electric lawn mower 1.

With the above construction of the electric lawn mower 1, the key insertion portion 31 for inserting the key 30 that is used for releasing the locked state of the mower body 10 or the electric motor 13 may be positioned proximal to the battery mount base 23 of the battery mount device 20. Therefore, the user can view the battery mount base 23 and the key insertion portion 31 in one glance. Hence, it is possible to reduce the likelihood that a user forgets to remove the key from the key insertion portion 31.

Further, the key insertion portion 31 may be positioned to the right of and away from the path of sliding movement of the battery 21. The sliding movement path is used when mounting the battery 21 to the battery mount device 20 and removing the battery 21 from the battery mount device 20. Therefore, the key 30 preferably does not interfere with the mounting and removing operations of the battery 21. Hence, it is possible to ensure ease of mounting and removing operations of the battery 21.

Furthermore, the key insertion portion 31 may be covered by the battery cover 22. Therefore, it is possible to prevent the key 30 and the key insertion portion 31, the battery 21, and the battery mount base 23 from getting wet with water and possibly being damaged.

Further, the locked state is preferably released when the key 30 is moved to a position where the surface of the knob portion 30a, having a plate-like configuration, extends substantially in the forward and rearward direction. Therefore, it is possible to minimize the lateral distance of the key 30 in the unlocked state, e.g., during the normal use of the electric lawn mower 1. Hence, it is possible to minimize the width of the battery cover 22 in the lateral direction. Consequently, it is also possible to reduce the size of the mower body 10 in the lateral direction.

Further, the key insertion portion 31 is preferably disposed on a right side portion of the mower body 10. It is also preferably positioned on the side opposite the mowing height adjusting mechanism 15 (more specifically, the mowing height adjusting lever 18). Therefore, the mowing height adjusting lever 18 and the lock mechanism can be arranged in a well-balanced manner with respect to the left and right directions. This may also contribute to reduce the size of the mower body 10 with respect to its lateral direction.

The above example may be modified in various ways. For example, although the key insertion portion 31 is disposed on the mower body 10 at a position on the right side of the battery mount base 23, the key insertion portion 31 may be disposed adjacent to the battery mount base 23 on the left side thereof.

Further, it may be possible to unlock the mower body 10 or the electric motor 13 when the key 30 moves to a position whereby the surface of the knob 30a extends substantially in the left and right directions. In this configuration, the battery cover 22 may also prevent the lock mechanism (including the key 30) from getting wet.

What is claimed is:

1. An electric lawn mower comprising:
a mower body including an electric motor, a cutting blade rotatably driven by the electric motor for mowing a lawn, a battery, and a battery mount configured to hold the battery, the electric motor being driven by electric power from the battery; and
a key and a key receiver for preventing an unauthorized use of the electric lawn mower, wherein
the key receiver is disposed on the mower body at a position spaced from the battery and extends in a direction generally parallel to a rotation axis of the electric motor, and
a mounting direction of the battery is inclined relative to a key insertion direction of the key,
wherein the key and the key receiver are positioned so as not to interfere with the battery during a mounting to and a removal from the battery mount.

2. An electric lawn mower comprising:
a mower body including an electric motor, a cutting blade rotatably driven by the electric motor for mowing a lawn, a battery, and a battery mount configured to hold the battery, the electric motor being driven by electric power from the battery;
a key and a key receiver for preventing an unauthorized use of the electric lawn mower; and
a cover configured to cover the key and the key receiver to prevent liquid from contacting the key and the key receiver, wherein
the key receiver is disposed on the mower body at a position spaced from the battery and extends in a direction generally parallel to a rotation axis of the electric motor, and
a mounting direction of the battery is inclined relative to a key insertion direction of the key.

3. The electric lawn mower according to claim 1, further comprising a mowing height adjuster for adjusting a mowing height of grass mowed by the cutting blade, wherein the key and the key receiver are disposed on one side of the battery mount and the mowing height adjuster is disposed on an opposite side of the battery mount.

4. An electric lawn mower comprising:
a mower body including an electric motor, a cutting blade rotatably driven by the electric motor for mowing a lawn, and a battery mount configured to hold a battery, the electric motor being driven by electric power from the battery; and
a lock including a key and a key receiver for locking and unlocking the electric motor, wherein the key receiver is spaced from the battery mount, the battery mount includes a battery cover that is openable and closable, a mounting direction of the battery is inclined relative to a key insertion direction of the key, when the key is inserted into the key receiver, the key is disposed in the electric lawn mower in a direction generally parallel to a rotation axis of the electric motor, and the electric motor is unlocked for operation, and when the battery cover is closed, the key is positioned so as to be covered by the battery cover.

5. The electric lawn mower according to claim 4, wherein the key receiver is disposed at a position that does not interfere with a mounting path provided for mounting and removing the battery from the battery mount.

6. The electric lawn mower according to claim 4, wherein:
the battery mount includes a battery mount base;
the battery mount base is disposed on the mower body and configured to hold the battery; and
the battery cover is configured to cover the battery mount base.

7. The electric lawn mower according to claim 4, wherein the key includes a knob configured as a flat plate, and the electric motor is unlocked when the key is positioned such that a surface of the knob extends substantially along a forward and rearward direction of the mower body.

8. The electric lawn mower according to claim 4, further comprising a mowing height adjusting lever operable to change a vertical position of the cutting blade for changing a mowing height, wherein the key receiver and the mowing height adjusting lever are positioned on opposite sides of the battery mount.

9. The electric lawn mower according to claim 4, wherein when the key is inserted into the key receiver, the key is disposed on the mower body at a position spaced from the battery and extends in a vertical direction.

10. The electric lawn mower according to claim 1, wherein the key and the key receiver are laterally spaced from the battery in a mower body width direction.

11. The electric lawn mower according to claim 1, wherein the key and the key receiver are laterally spaced from the battery in a mower body width direction.

12. The electric lawn mower according to claim 2, further comprising a mowing height adjuster for adjusting a mowing height of grass mowed by the cutting blade, wherein the key and the key receiver are disposed on one side of the battery mount and the mowing height adjuster is disposed on an opposite side of the battery mount.

13. The electric lawn mower according to claim 2, wherein the key and the key receiver are laterally spaced from the battery in a mower body width direction.

* * * * *

UNITED STATES PATENT AND TRADEMARK OFFICE
CERTIFICATE OF CORRECTION

PATENT NO. : 8,935,907 B2  
APPLICATION NO. : 13/495358  
DATED : January 20, 2015  
INVENTOR(S) : H. Abe et al.

Page 1 of 1

It is certified that error appears in the above-identified patent and that said Letters Patent is hereby corrected as shown below:

In the Claims

In column 16, line 14 (claim 11, line 1) please change "claim 1" to -- claim 4 --

Signed and Sealed this
Twenty-seventh Day of October, 2015

Michelle K. Lee
*Director of the United States Patent and Trademark Office*